Figure 4:
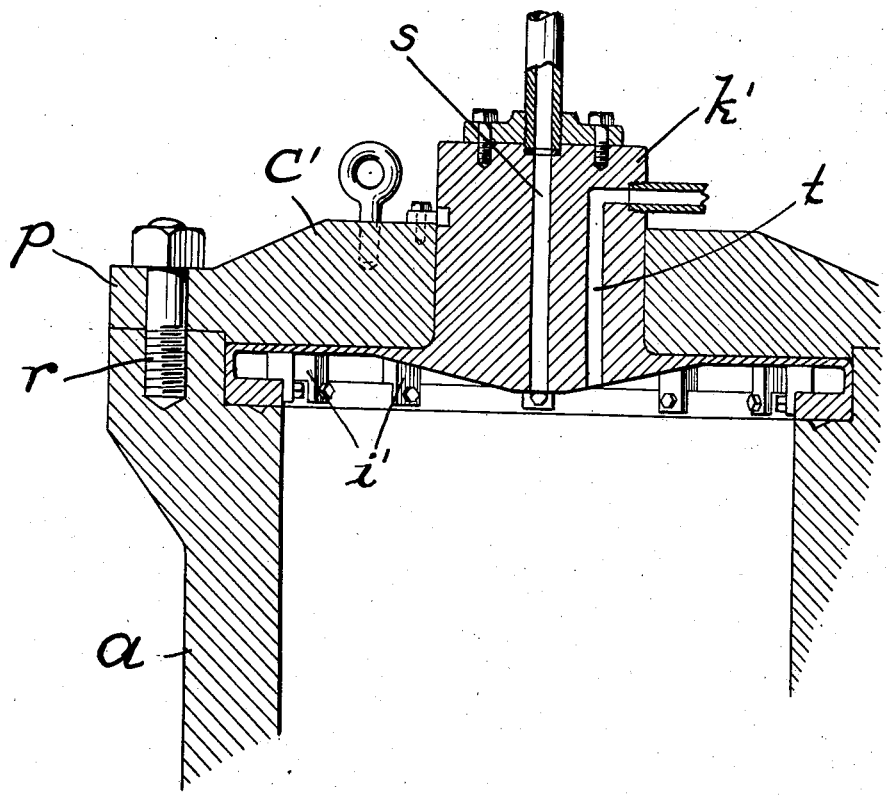

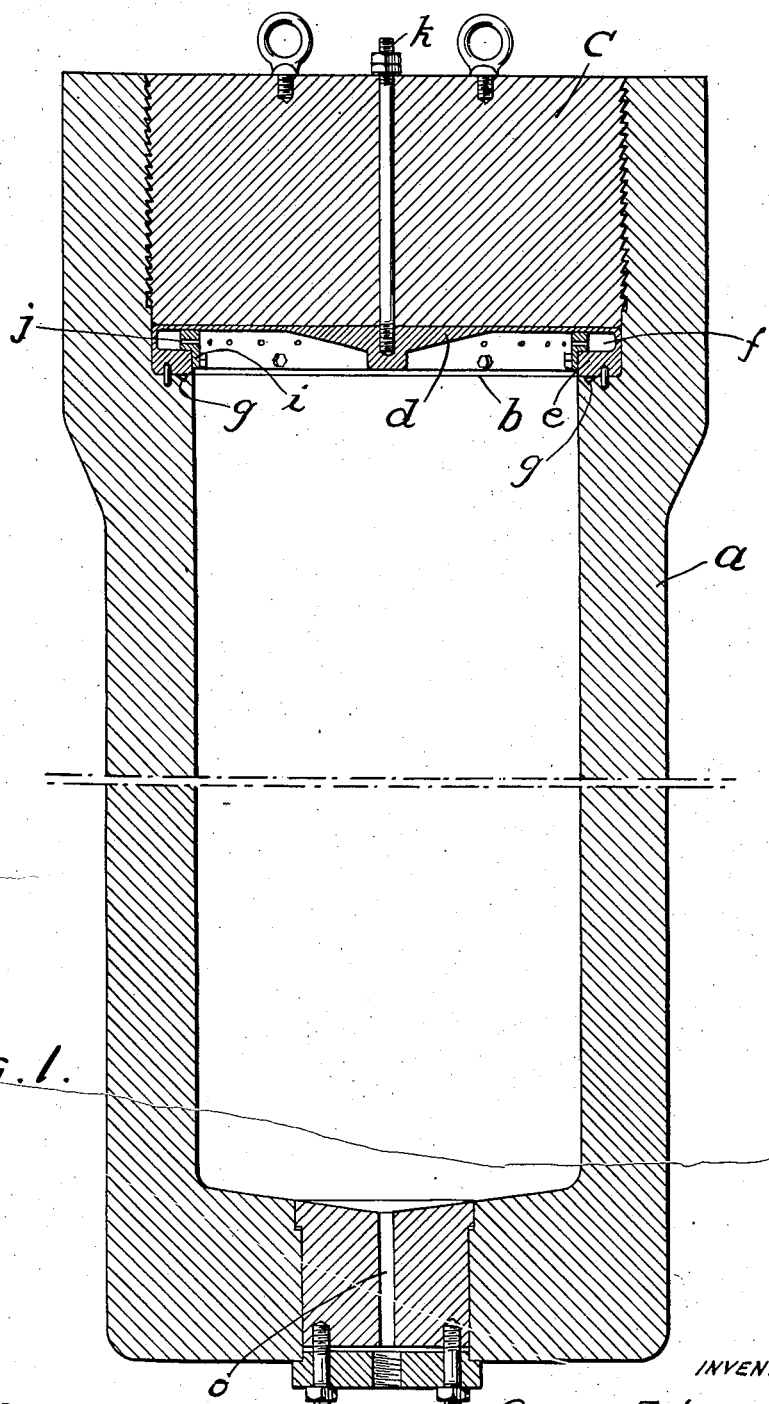

Oct. 18, 1938.                G. ERICSSON ET AL                2,133,934
                        CLOSURE FOR PRESSURE VESSELS
                            Filed July 18, 1936           3 Sheets-Sheet 2
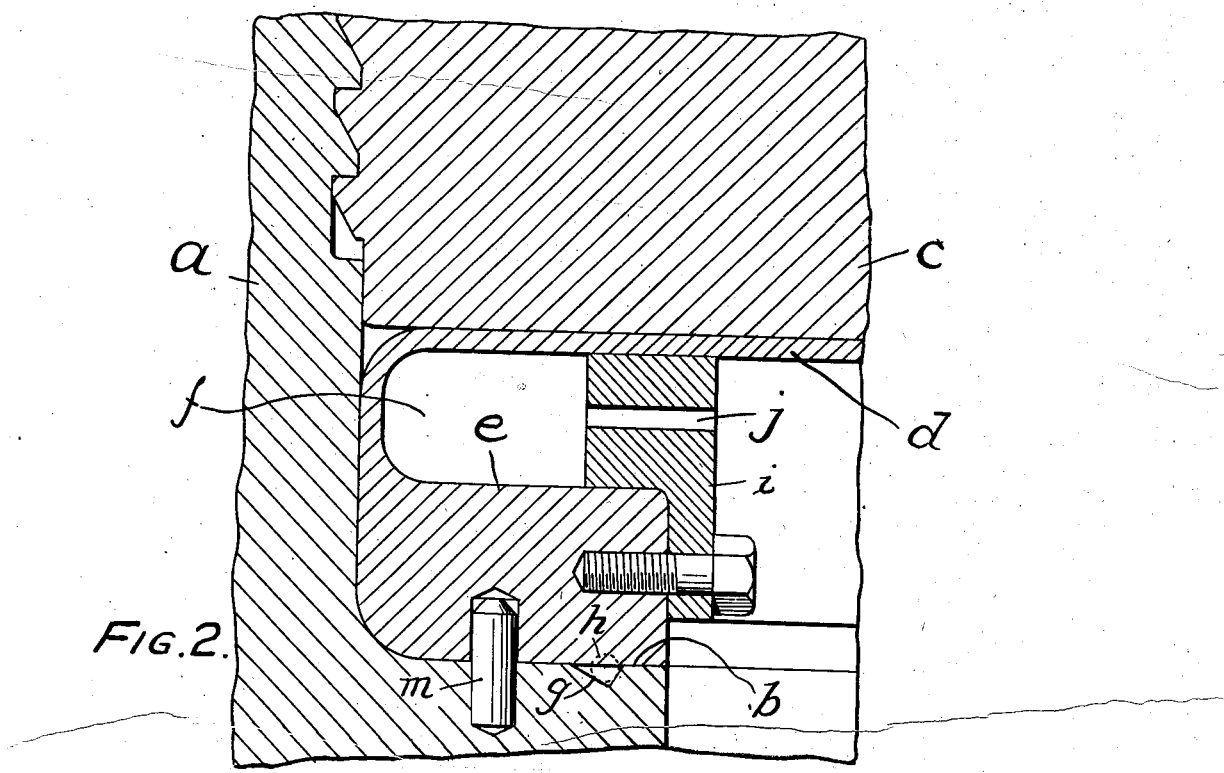
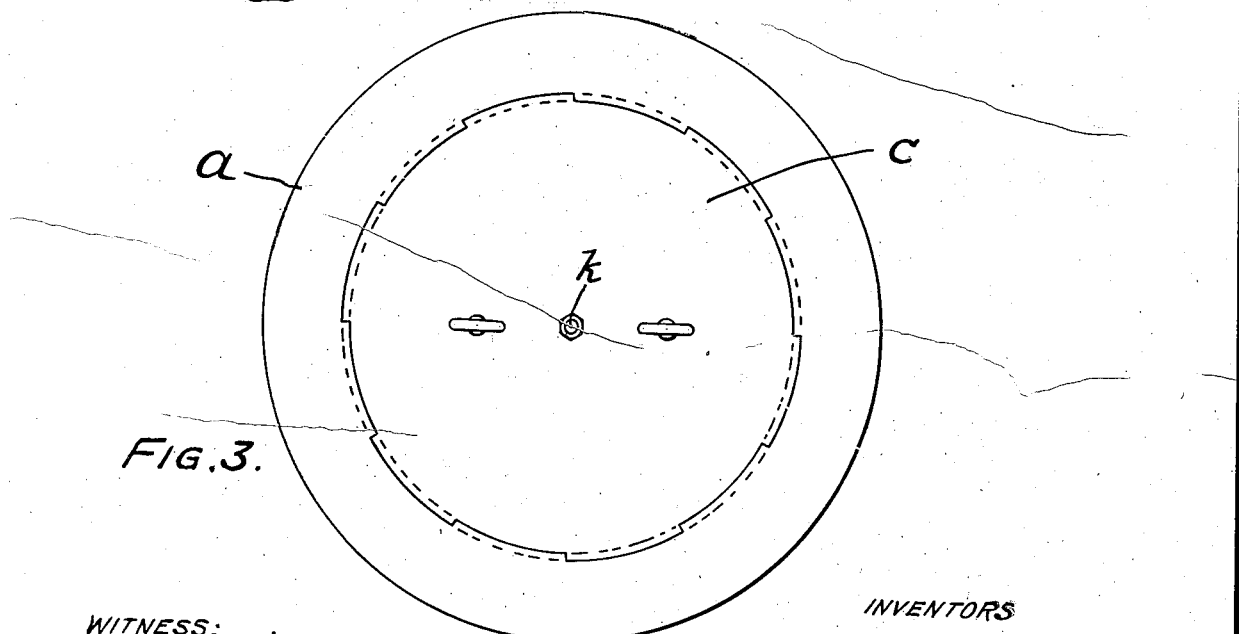
INVENTORS
Gunnar Ericsson
John L. Cox
BY
Busser & Harding
ATTORNEYS Oct. 18, 1938.   G. ERICSSON ET AL   2,133,934
CLOSURE FOR PRESSURE VESSELS
Filed July 18, 1936   3 Sheets-Sheet 3

WITNESS:

INVENTORS
Gunnar Ericsson
John L. Cox
BY
ATTORNEYS.

Patented Oct. 18, 1938

2,133,934

UNITED STATES PATENT OFFICE 2,133,934

CLOSURE FOR PRESSURE VESSELS

Gunnar Ericsson, Philadelphia, and John L. Cox, Springfield Township, Montgomery County, Pa., assignors to The Midvale Company, Philadelphia, Pa., a corporation of Delaware Application July 18, 1936, Serial No. 91,356

4 Claims. (Cl. 220—3)

In the art of synthesizing chemicals, impregnating materials with gases, and in other analogous arts, it, in many instances, is necessary to perform the operation under superatmospheric pressure, such pressures varying from pressures slightly above atmospheric to pressures of many thousand pounds to the square inch. Such operations are necessarily conducted within a closed chamber which must be sealed against escape of contained materials. Since in many cases the chamber must be opened to receive the material or materials to be treated, synthesized, amalgamated or impregnated and to remove the finished product or replenish the catalyst, it must be provided with a removable closure, which must make an effective seal. It is also highly desirable that the closure should be capable of quick removal and replacement, since chambers of the kind specified are very expensive, and it is important, from the standpoint of economical operation, that they should not be out of operation for a substantial length of time between successive operations.

The object of the invention is to provide a chamber meeting the requirements above specified.

A preferred embodiment of the invention is shown in the drawings, wherein Fig. 1 is a longitudinal sectional view of the chamber with its removable closure in closed position; Fig. 2 is a view, in the same sectional plane as Fig. 1, of part of the structure of Fig. 1 on an enlarged scale; Fig. 3 is a plan view of Fig. 1 after the head is lowered toward closing position but before being turned on its axis to effect final closure; and Fig. 4 is a longitudinal sectional view of a modified removable closure.

The main body of the chamber is a cylinder $a$ which at its open end is of enlarged diameter, the enlargement being abrupt to form an annular shoulder $b$ having a smooth face extending in a plane at right angles to the axis of the cylinder.

The closure is effected by means of a removable head $c$ which, when in closed position, extends within the enlarged end of the cylinder. Positioned between the head $c$ and the shoulder $b$ is a member $d$, the main body of which is of disc-like shape and which comprises a comparatively thick central portion tapering in thickness toward its periphery and throughout most of its area so comparatively thin as to be capable of flexing under pressure. The member $d$ is provided with a circumferential flange which extends downward and thence inward, the downward extension being of about the same thickness as the thin body and the inward extension $e$ being comparatively thick and inflexible and spaced from the body to form a pocket $f$ the purpose and function of which is hereinafter described. The lower face of the element $e$ has a smooth plane surface adapted to contact with the smooth plane surface of the shoulder $b$.

Formed in one face of the shoulder $b$ or in one face of the element $e$ (preferably in the face of shoulder $b$) is an annular groove $g$, preferably of triangular cross-section for rubber gaskets, in which is inserted a deformable gasket $h$, for example, of soft metal or rubber, which, when element $e$ is forced against shoulder $b$, will be deformed to assume approximately the shape of, and fill, the groove, thereby affording a resistance to the escape of the contents of the cylinder between element $e$ and shoulder $b$. As the internal pressure rises, there is required an increasing pressure against the gasket by the contacting surfaces to prevent the escape of the contents of the cylinder, and our invention is designed automatically to produce that increasing pressure.

Bolted to the inner face of the element $e$ is the flange of a ring $i$, the body of which is confined between the element $e$ and the member $d$ and limits the extent to which the head $c$ may be inserted within the cylinder. Pocket $f$ has free fluid communication with the interior of the cylinder through one or a number of holes $j$ extending between the inner and outer faces of the ring, so that the pocket $f$ is under the same pressure as the interior of the cylinder. This ring is a desirable, but in some cases an unnecessary, provision.

It is desirable that the head $c$ should carry the member $d$ so that the member $d$ may be positioned and withdrawn by the mere insertion and removal of the head $c$. This may be effected by securing to the central thickened part of member $d$ a bolt $k$ which extends up through the center of the head $c$, the free upstanding shank of the bolt being slightly longer than the thickness of the head.

The internal wall of the enlarged end of the cylinder and the peripheral wall of the head are provided with complementary interrupted screw threads. In positioning the head preparatory to moving it down into closing position, the threaded arcuate portions of the head are aligned with the blank arcuate portions of the enlarged end of the cylinder, and the head may then be lowered into position by a straight movement along the axis of the cylinder. The head is lowered until the member $d$ contacts with shoulder $b$. In this movement one or more pins $m$, seated in, and projecting above the face of, the shoulder $b$, extend into aligning holes in the element $e$ and prevent the latter having any turning movement relative to the cylinder. After the head $c$ and the member $d$ carried thereby are thus preliminarily positioned, the head $c$ is given a fractional rotation movement causing the threads thereon to engage the threads on the internal wall of the cylinder, thereby moving the head downward and causing it to contact member $d$ and press ring $i$ against element $e$, which thus confines the gasket in groove $g$ against the shoulder $b$.

The pressure of fluids tending to leak beyond the gasket $h$ is counterbalanced by the fluid pressure within pocket $f$, thereby insuring against any escape of fluids from within the cylinder.

It is clear that the application of the closure to the cylinder may be effected with the utmost expedition. Its removal, also, may be quickly accomplished. After the removal of the head, the gasket $h$, which is of inconsiderable value, if impaired, may be removed and replaced by a fresh gasket preparatory to the next operation.

If the interior of the cylinder is to be supplied, after the cylinder is closed, with pressure fluids, these may be introduced through the orifice $o$ in the bottom of the cylinder or in any other known and convenient way. By making the bolt $k$ integral with the member $d$ and by increasing its diameter to a considerable size, to form a shank $k'$, such as is illustrated in Fig. 4, access for fluids to the interior of the cylinder can be had through this shank (in addition to, or in place of, access through the lower head), which is frequently, if not generally, desirable. In Fig. 4 means providing such access is shown as furnished by either or both of the channels $s$ and $t$.

It is obvious that means other than those shown for retaining head $c$ in position against internal pressure will operate satisfactorily even if not so rapidly. For example, the head can be supplied with a flange $p$ enabling it to be bolted in place by stud bolts $r$ planted in the upper face of cylinder $a$, as illustrated in Fig. 4, in which the head is lettered $c'$. Other ways of retaining the head in position may be adopted, our invention not being limited to any particular construction to effectuate the positioning of the end closure.

The spacing ring $i$, when employed, need not be continuous throughout its circumference, although a continuous ring affords the most readily applied spacing expedient. A series of spaced-apart blocks $i'$, as shown in Fig. 4, constitutes an obvious equivalent for a unitary ring.

What we claim and desire to protect by Letters Patent is:

1. A chamber adapted to be subjected to superatmospheric pressure and which may be quickly opened and closed and which when closed will be secure against leakage, the same comprising a cylindrical body the internal wall of which adjacent one open end is shaped to provide an internal annular shoulder, an end closure comprising a head engageable with the end of the cylinder above the shoulder and a member of the diameter of the head confinable between said head and shoulder, said member comprising a comparatively thin disc-like body portion of metal capable of flexing and provided with a peripheral flange extending downward and inward, the inward extension being comparatively thick and inflexible and engaging the shoulder, said flange forming a pocket communicating with the interior of the cylinder and tending to maintain a fluid-tight seal between the inward extension of said flange and the internal shoulder on the cylinder, means to hold said member, when in position, from turning circumferentially within the cylinder, the inner wall of the cylinder above the shoulder and the exterior of the closure head being provided with cooperative interrupted screw threads, and means supporting said member from said head but allowing the head to have a helical movement incident to its closure without turning said member within the cylinder while at the same time pressing said member between said head and shoulder.

2. A chamber adapted to be subjected to superatmospheric pressure and which may be quickly opened and closed and which when closed will be secure against leakage, the same comprising a cylindrical body the internal wall of which adjacent one open end is shaped to provide an internal annular shoulder, an end closure comprising a head engageable with the end of the cylinder above the shoulder, a member confinable between said head and said shoulder, said member comprising a comparatively thin disc-like body portion of metal capable of flexing and provided with a peripheral flange extending downward and inward, the inward extension being comparatively thick and inflexible and engaging the shoulder, and compressible sealing means confinable between the inward extension of said member and said shoulder, said member having a pocket in its periphery in free communication with the interior of the cylinder to provide a pressure operative to hold said inward extension tightly against said shoulder and to cooperate with said sealing means to prevent leakage between said inward extension and said shoulder to the exterior wall of the cylinder.

3. A chamber in accordance with claim 2 wherein the member confinable between the removable head and said shoulder has a comparatively thick central portion extending through the head.

4. A chamber adapted to be subjected to superatmospheric pressure and which may be quickly opened and closed and which when closed will be secure against leakage, the same comprising a cylindrical body the internal wall of which adjacent one open end is shaped to provide an internal annular shoulder, an end closure comprising a head engageable with the end of the cylinder above the shoulder and a member confinable between said head and shoulder, said member comprising a comparatively thin disc-like body portion of metal capable of flexing and provided with a peripheral flange extending downward and inward, the inward extension being comparatively thick and inflexible and engaging the shoulder, said flange forming a pocket communicating with the interior of the cylinder and tending to maintain a fluid-tight seal between the inward extension of said flange and the internal shoulder on the cylinder, said member being provided with a central hub of considerable diameter extending through the head, said hub having a channel providing access for fluids to the interior of the chamber.

GUNNAR ERICSSON.
JOHN L. COX.